(12) United States Patent
Lu et al.

(10) Patent No.: US 11,422,646 B2
(45) Date of Patent: Aug. 23, 2022

(54) MOUSE PAD DEVICE

(71) Applicant: DEXIN CORPORATION, New Taipei (TW)

(72) Inventors: Ho-Lung Lu, New Taipei (TW); Pai-Yang Chou, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 0 days.

(21) Appl. No.: 17/322,933

(22) Filed: May 18, 2021

(65) Prior Publication Data

US 2022/0137728 A1 May 5, 2022

(30) Foreign Application Priority Data

Nov. 4, 2020 (TW) ................................ 109138400

(51) Int. Cl.
*G06F 3/039* (2013.01)
*H02J 50/10* (2016.01)

(52) U.S. Cl.
CPC ............ *G06F 3/0395* (2013.01); *H02J 50/10* (2016.02)

(58) Field of Classification Search
CPC ........ G06F 3/0395; G06F 3/038; G06F 3/046; G06F 3/047; H02J 50/10; H02J 50/402; H02J 5/005
See application file for complete search history.

(56) References Cited

U.S. PATENT DOCUMENTS

| 11,003,263 B2 | 5/2021 | Chou |
| 11,018,530 B2 | 5/2021 | Narayana Bhat et al. |
| 2014/0139039 A1* | 5/2014 | Cook .................. H02J 50/12 307/104 |
| 2020/0218370 A1* | 7/2020 | Lu ..................... H01F 38/14 |
| 2020/0365316 A1* | 11/2020 | Tikka .................. H01F 27/34 |

FOREIGN PATENT DOCUMENTS

| CN | 103853359 A | 6/2014 |
| CN | 210038732 U | 2/2020 |
| TW | M319456 U | 9/2007 |
| TW | M569517 U | 11/2018 |
| TW | 202015308 A | 4/2020 |
| TW | 202026823 A | 7/2020 |

* cited by examiner

*Primary Examiner* — Robert J Michaud
(74) *Attorney, Agent, or Firm* — Li & Cai Intellectual Property Office

(57) ABSTRACT

A mouse pad device is provided. The mouse pad device includes a mouse pad main body, a control module, a first electrical connection circuit and a second electrical connection circuit. The control module is disposed on a first area of a first side of the mouse pad main body. The first electrical connection circuit is electrically connected to the second electrical connection circuit on a second side of the mouse pad main body. The first side of the mouse pad main body and the second side of the mouse pad main body are opposite sides. The first electrical connection circuit and the second electrical connection circuit are each laid along a periphery of a third area of the second side of the mouse pad main body.

9 Claims, 4 Drawing Sheets

MOUSE PAD DEVICE

CROSS-REFERENCE TO RELATED PATENT APPLICATION

This application claims the benefit of priority to Taiwan Patent Application No. 109138400, filed on Nov. 4, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a mouse pad device, and more particularly to a mouse pad device having a wireless charging function.

BACKGROUND OF THE DISCLOSURE

Currently, most wireless mice have a wireless charging function. However, most of conventional mouse pads do not have the wireless charging function.

Therefore, providing a mouse pad device having the wireless charging function has become one of the important issues in the related field.

SUMMARY OF THE DISCLOSURE

In response to the above-referenced technical inadequacy, the present disclosure provides a mouse pad device, which includes a mouse pad main body, a control module, a first electrical connection circuit and a second electrical connection circuit. The mouse pad main body has a first area, a second area and a third area. The first area, the second area and the third area are arranged adjacent to each other in sequence. The mouse pad main body has a first side and a second side. The first area is arranged on the first side of the mouse pad main body, the third area is arranged on the second side of the mouse pad main body, and the second area is arranged between the first area and the third area. The control module is disposed on the first area of the first side of the mouse pad main body. The first electrical connection circuit is electrically connected to the control module. The second electrical connection circuit is electrically connected to the control module. The first electrical connection circuit is electrically connected to the second electrical connection circuit on the second side of the mouse pad main body. The first side of the mouse pad main body and the second side of the mouse pad main body are arranged on opposite sides. The first electrical connection circuit and the second electrical connection circuit are each laid along a periphery of the third area of the second side of the mouse pad main body.

Therefore, one of the beneficial effects of the present disclosure is that, the mouse pad device having a large area provided by the present disclosure at least has an area where a keyboard device is free from disturbance when the keyboard device is disposed on the area of the mouse pad device, and further provides a mouse working area for wireless charging of the mouse device, so that a user can use the keyboard device and the mouse device on the mouse pad device simultaneously. In this way, a user experience can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
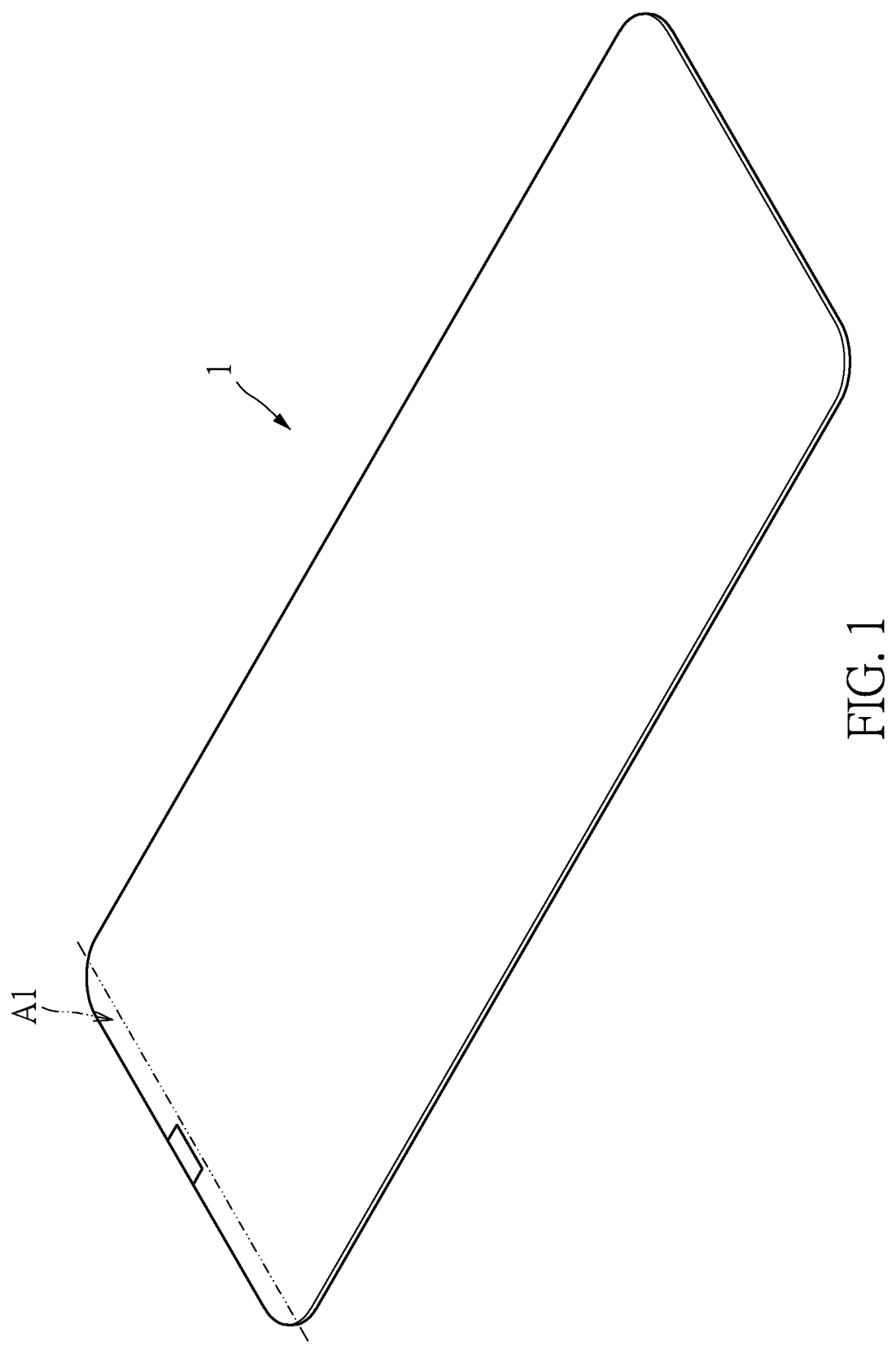
FIG. 1 is a schematic view of a mouse pad device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
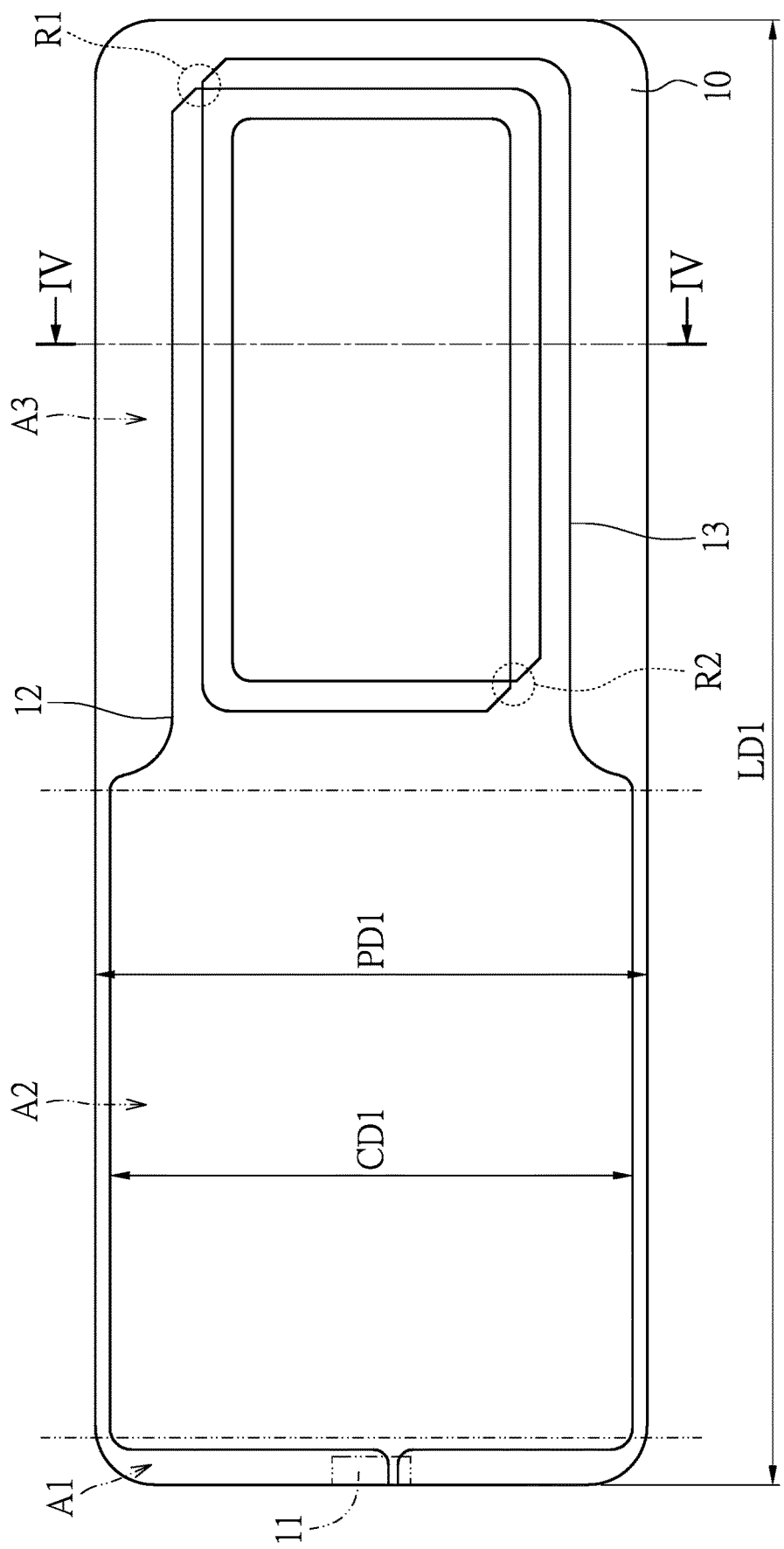
FIG. 2 is a schematic top view of the mouse pad device according to the present disclosure.

Referring to FIG. 1 and FIG. 2, FIG. 1 is a schematic view of a mouse pad device according to the present disclosure, and FIG. 2 is a schematic top view of the mouse pad device according to the present disclosure.

A mouse pad device 1 includes a mouse pad main body 10, a control module 11, a first electrical connection circuit 12 and a second electrical connection circuit 13.

The mouse pad main body 10 has a first side and a second side. The first side of the mouse pad main body 10 and the second side of the mouse pad main body 10 are arranged opposite to each other. The mouse pad main body 10 has a first area A1, a second area A2 and a third area A3. The first area A1, the second area A2 and the third area A3 are arranged adjacent to each other in sequence. The first area A1 is arranged on the first side of the mouse pad main body 10. The third area A3 is arranged on the second side of the mouse pad main body 10. In the present embodiment, the first area A1, the second area A2 and the third area A3 have different sizes. The sizes of the first area A1, the second area A2 and the third area A3 are determined according to configurations of the control module 11, a wireless charging coil formed by the first electrical connection circuit 12 and the second electrical connection circuit 13, and an electronic device (i.e., a keyboard device) to be disposed on the mouse pad main body 10.

The control module 11 is disposed on the first area A1 of the first side of the mouse pad main body 10. The first electrical connection circuit 12 and the second electrical connection circuit 13 are each electrically connected to the control module 10. The first electrical connection circuit 12 is electrically connected to the second electrical connection circuit 13 on the second side of the mouse pad main body 10. In addition, the first electrical connection circuit 12 and the second electrical connection circuit 13 are laid along a periphery of the third area A3 of the second side of the mouse pad main body 10. That is, the first electrical connection circuit 12 and the second electrical connection circuit 13 are each wound in an annular manner to form the wireless charging coil, which occupies an area on the second side of the mouse pad main body 10.

The control module 10 includes a wireless charging control circuit (not shown in figures). The wireless charging control circuit is electrically connected to the first electrical connection circuit 12 and the second electrical connection circuit 13, and provides working electrical energy to the wireless charging coil formed by the first electrical connection circuit 12 and the second electrical connection circuit 13. In the present embodiment, the wireless charging control circuit (not shown in figures) of the control module 10 is electrically connected to an alternating current power or a direct current power, so as to provide the working electrical energy to the first electrical connection circuit 12 and the second electrical connection circuit 13.

The wireless charging coil formed by the first electrical connection circuit 12 and the second electrical connection circuit 13 can be an inductive wireless charging coil or a resonant wireless charging coil, but the present disclosure is not limited thereto. The first side of the mouse pad main body 10 and the second side of the mouse pad main body 10 are arranged on opposite sides.

Figure 3:
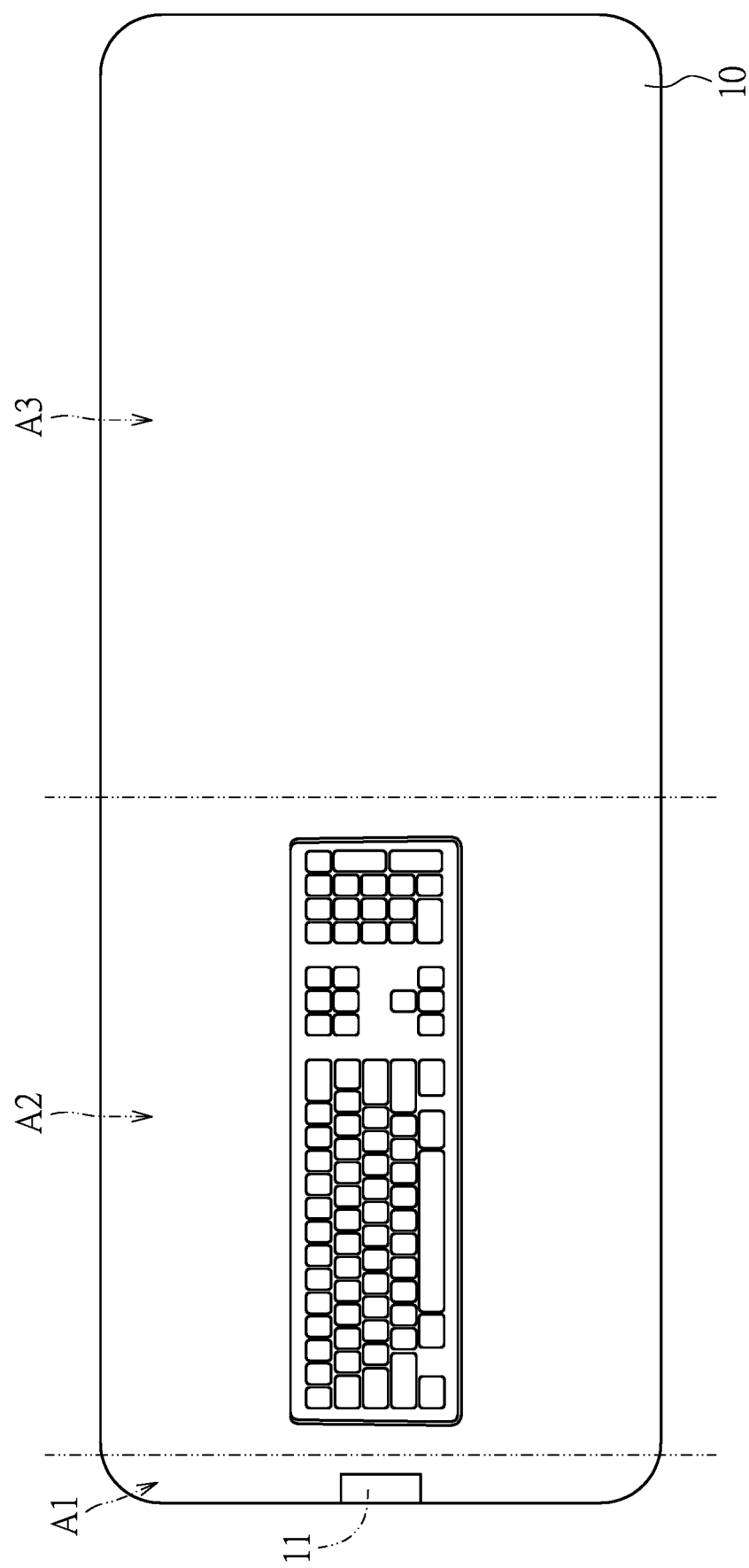
FIG. 3 is a schematic view showing a keyboard device being disposed on the mouse pad device according to the present disclosure.

Referring to FIG. 3, FIG. 3 is a schematic view showing a keyboard device being disposed on the mouse pad device according to the present disclosure.

In the present embodiment, the mouse pad main body 10 has a long side and a short side. The long side of the mouse pad main body 10 has a long side distance LD1. The long side distance LD1 of the long side of the mouse pad main body 10 is greater than a length of the third area A3 plus that of a full-sized keyboard device, the third area A3 having the wireless charging coil that is formed by the first electrical connection circuit 12 and the second electrical connection circuit 13 arranged thereon.

In addition, a short side distance PD1 of the short side of the mouse pad main body 10 is much greater than a short side length of the full-sized keyboard device.

The first electrical connection circuit 12 and the second electrical connection circuit 13 are arranged on a corresponding edge on two sides of the second area A2, and is electrically connected to the control module 11. That is, the first electrical connection circuit 12 and the second electrical connection circuit 13 are laid from the first area A1 where the control module 11 is disposed. When entering the second area A2 of the mouse pad main body 10, the first electrical connection circuit 12 and the second electrical connection circuit 13 respectively extend along the corresponding edges on the two sides of the second area A2. In the second area A2, the first electrical connection circuit 12 and the second electrical connection circuit 13 are each arranged on a corresponding side of an area that is not laid with any circuit or any electronic device. At least one full-sized keyboard device can be disposed on the area that is not laid with any circuit or any electronic device. The keyboard device can be protected from a disturbance caused by the first electrical connection circuit 12 and the second electrical connection circuit 13.

That is, when the keyboard device is disposed on the second area A2, a distance CD1 between the first electrical connection circuit 12 and the second electrical connection circuit 13 is greater than a short side distance of a short side of the keyboard device. In addition, the distance CD1 between the first electrical connection circuit 12 and the second electrical connection circuit 13 is less than the short side distance PD1 of the short side of the mouse pad main body 10. In the present embodiment, when being arranged on the second area A2, the first electrical connection circuit 12 and the second electrical connection circuit 13 are respectively in closer proximity to the corresponding edges of the second area A2 of the mouse pad main body 10.

Figure 4:
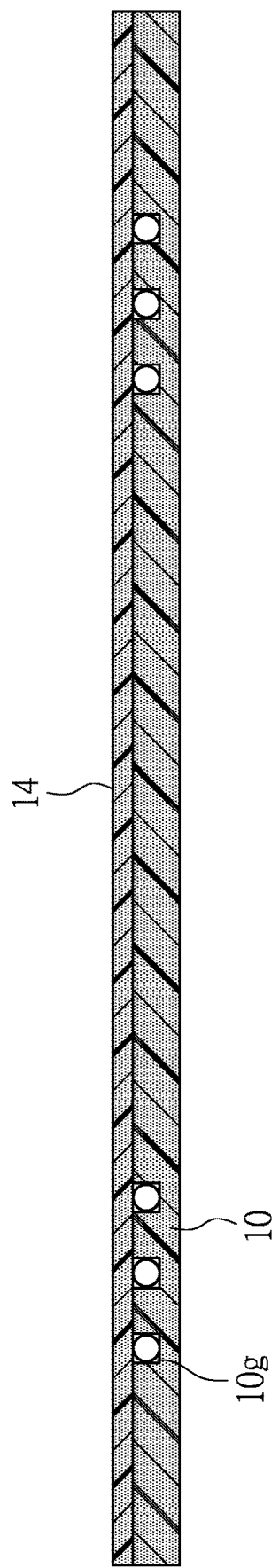
FIG. 4 is a schematic side view of the mouse pad device taken along line IV-IV of FIG. 2 according to the present disclosure.

Referring to FIG. 4, FIG. 4 is a schematic side view of the mouse pad device taken along line IV-IV according to the present disclosure.

The mouse pad main body 10 further has a plurality of grooves 10g for accommodating the first electrical connection circuit 12 and the second electrical connection circuit 13. In the present embodiment, each of the plurality of the grooves 10g is communicated with each other.

The first electrical connection circuit 12 and the second electrical connection circuit 13 can each be a single-core wire or a stranded wire, but the present disclosure is not limited thereto. In addition, a length of each of the first electrical connection circuit 12 and the second electrical connection circuit 13 can be adjusted according to practical requirements. The first electrical connection circuit 12 can be the same as or different from the second electrical connection circuit 13. In the present embodiment, a region R1 and a region R2 are locations where the first electrical connection circuit 12 and the second electrical connection circuit 13 are interlaced. A main reason for the groove 10g in each of the region R1 and the region R2 being deeper than that in another region is to allow both the first electrical connection circuit 12 and the second electrical connection circuit 13 to be disposed in the region R1 and the region R2 at the same time. In the present embodiment, the plurality of grooves 10g are formed by etching, such as laser etching. In addition, the mouse pad device 1 can further include a cover layer 14 disposed on the mouse pad main body 10, so as to enclose the plurality of grooves 10g, the first electrical connection circuit 12 and the second electrical connection circuit 13.

The mouse pad main body 10 is made of plastic, wood, metal, gel, glass, or a cloth material.

In the present embodiment, the keyboard device can be disposed on the second area A2 for use, and the mouse device can be disposed on the third area A3 for charging. In addition, since the first electrical connection circuit 12 and the second electrical connection circuit 13 are respectively arranged on the two sides of the second area A2, no electrical circuit or electric current passes under a region of the second area A2 where the keyboard is disposed. Therefore, the keyboard is protected from the disturbance caused by the first electrical connection circuit 12 and the second electrical connection circuit 13.

Beneficial Effects of the Embodiment

In conclusion, one of the beneficial effects of the present disclosure is that, the mouse pad device having a large area provided by the present disclosure has the area where the keyboard device is not disturbed by an electromagnetic force or the electric current when the keyboard device is disposed on the area of the mouse pad device, and further provides a mouse working area for wireless charging of the mouse device, so that a user can use the keyboard device and the mouse device on the mouse pad device simultaneously. In this way, a user experience can be effectively improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A mouse pad device, comprising:
   a mouse pad main body having a first area, a second area and a third area, the first area, the second area and the third area being arranged adjacent to each other in sequence, the mouse pad main body having a first side and a second side, the first area being arranged on the first side of the mouse pad main body, the third area being arranged on the second side of the mouse pad main body, and the second area being arranged between the first area and the third area, wherein the first area, the second area and the third area lie on a plane of the mouse pad main body, and the plane includes the first side and the second side;
   a control module disposed on the first area of the first side of the mouse pad main body;
   a first electrical connection circuit electrically connected to the control module; and
   a second electrical connection circuit electrically connected to the control module;
   wherein the first electrical connection circuit is electrically connected to the second electrical connection circuit on the second side of the mouse pad main body, and the first side of the mouse pad main body and the second side of the mouse pad main body are opposite sides;
   wherein the first electrical connection circuit and the second electrical connection circuit are each laid along a periphery of the third area of the second side of the mouse pad main body;
   wherein the first electrical connection circuit and the second electrical connection circuit are arranged on two sides of the second area, and no electric current passes under the second area when a keyboard device is disposed on the second area;
   wherein the first electrical connection circuit and the second electrical connection circuit form a wireless charging coil in the third area, and the wireless charging coil charges a mouse device when the mouse device is disposed on the third area.

2. The mouse pad device according to claim 1, wherein the mouse pad main body has a plurality of grooves for accommodating the first electrical connection circuit and the second electrical connection circuit.

3. The mouse pad device according to claim 2, wherein the first electrical connection circuit and the second electrical connection circuit respectively extend along the corresponding edges on the two sides of the second area, so as to be electrically connected to the control module, the first electrical connection circuit and the second electrical connection circuit are wound on the third area in an annular manner to form the wireless charging coil, and the first electrical connection circuit and the second electrical connection circuit are interlaced.

4. The mouse pad device according to claim 3, wherein the mouse pad main body has a long side and a short side, a distance between the first electrical connection circuit and the second electrical connection circuit in the second area is greater than a short side distance of a short side of the keyboard device, and a long side distance of the long side of the mouse pad main body minus a length of the third area is greater than a length of the keyboard device.

5. The mouse pad device according to claim 4, wherein the first electrical connection circuit and the second electrical connection circuit are each a single-core wire or a stranded wire.

6. The mouse pad device according to claim 5, wherein the mouse pad main body is made of plastic, wood, metal, gel, glass or a cloth material.

7. The mouse pad device according to claim 6, wherein the control module includes a wireless charging control circuit, and the wireless charging control circuit is electrically connected to the first electrical connection circuit and the second electrical connection circuit, so as to provide working electrical energy to the wireless charging coil formed by the first electrical connection circuit and the second electrical connection circuit.

8. The mouse pad device according to claim 7, wherein the control module is electrically connected to an alternating current power or a direct current power, so as to provide the working electrical energy to the first electrical connection circuit and the second electrical connection circuit.

9. The mouse pad device according to claim 8, wherein the mouse pad main body further includes a cover layer covering the plurality of grooves.

* * * * *